United States Patent
Aldalbahi et al.

(10) Patent No.: US 11,342,973 B1
(45) Date of Patent: May 24, 2022

(54) SYSTEM AND METHOD FOR MAINTAINING LINK COMMUNICATIONS IN MILLIMETER WAVE CELLULAR NETWORKS

(71) Applicant: KING FAISAL UNIVERSITY, Al-Ahsa (SA)

(72) Inventors: Adel Aldalbahi, Al-Ahsa (SA); Mohammad A. Jasim, Alliance, OH (US)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 17/505,580

(22) Filed: Oct. 19, 2021

(51) Int. Cl.
*H04B 7/0456* (2017.01)

(52) U.S. Cl.
CPC .................................. *H04B 7/0473* (2013.01)

(58) Field of Classification Search
CPC ... H04B 7/00; H04B 7/02; H04B 7/04; H04B 7/0413; H04B 7/0456; H04B 7/046; H04B 7/0473; H04W 36/00; H04W 36/24; H04W 36/30; H04W 36/305; H04W 36/0079
See application file for complete search history.

(56) References Cited

U.S. PATENT DOCUMENTS

| | | | | |
|---|---|---|---|---|
| 8,385,305 B1* | 2/2013 | Negus | ....................... | H04J 1/00 370/338 |
| 8,457,698 B2* | 6/2013 | Samardzija | ............ | H01Q 1/246 455/575.7 |
| 9,140,779 B2* | 9/2015 | Smits | ..................... | G01S 7/4004 |
| 9,191,957 B2* | 11/2015 | Kim | ....................... | H04B 7/063 |
| 9,425,880 B2* | 8/2016 | Kim | ..................... | H04L 27/2628 |
| 9,654,264 B2* | 5/2017 | Athley | ................. | H04B 7/0684 |
| 9,674,852 B2* | 6/2017 | Heo | ................... | H04W 72/0486 |
| 9,867,060 B2* | 1/2018 | Inoue | ................... | H04B 7/0417 |
| 9,967,013 B2* | 5/2018 | Kang | ................. | H04L 25/0202 |
| 10,028,303 B2* | 7/2018 | Cariou | ............. | H04W 74/0816 |
| 10,051,484 B2* | 8/2018 | Shen | ..................... | H04W 16/28 |
| 10,056,956 B2* | 8/2018 | Rahman | .............. | H04B 7/0626 |

(Continued)

OTHER PUBLICATIONS

Aldalbahi,"Multi-Backup Beams for Instantaneous Link Recovery in mm Wave Communications", Electronics (2019),vol. 8. pp. 1145-1155.

*Primary Examiner* — James M Perez
(74) *Attorney, Agent, or Firm* — Nath, Goldberg & Meyer; Richard C. Litman (57) ABSTRACT

The system and method for maintaining communications in a cellular network provides for automatically generating a bundle of partially overlapping beams when the primary link between a base station (BS) and a mobile station (MS) degrades so that the signal-to-noise ratio (SNR) of a received transmission falls below a defined threshold. The overlapping beams are generated by a beamformer having a circular array of antennas, the array being divided into groups radiating the signal in adjacent but partially overlapping sectors at an amplitude determined by extended Hamming codes having zero cross correlation. The bundle is radiated over a 360° pattern so that it overlaps the blocked signal. The MS demodulates and retrieves received signals having the highest correlation. The recovery time is quicker than conventional systems and methods, e.g., 200 microseconds when the MS uses a narrow pencil beam (5° beamwidth).

19 Claims, 6 Drawing Sheets

(56) References Cited

U.S. PATENT DOCUMENTS

| | | | |
|---|---|---|---|
| 10,116,370 B2* | 10/2018 | Obara | H04B 7/10 |
| 10,181,964 B2* | 1/2019 | Yum | H04L 25/0204 |
| 10,327,156 B2* | 6/2019 | Byun | H04W 16/32 |
| 10,367,565 B2* | 7/2019 | Jayawardene | H04B 7/0632 |
| 10,425,855 B2* | 9/2019 | Sun | H04W 28/0236 |
| 10,574,308 B2* | 2/2020 | Wernersson | H04B 7/0473 |
| 10,700,753 B2* | 6/2020 | Islam | H04B 17/327 |
| 10,892,814 B2* | 1/2021 | Solichien | H04B 7/086 |
| 10,917,160 B2* | 2/2021 | Miyazaki | H04B 7/0452 |
| 10,972,169 B2* | 4/2021 | Ku | H04B 17/336 |
| 11,025,329 B2* | 6/2021 | Takano | H04L 5/0048 |
| 11,063,652 B2* | 7/2021 | Xiong | H04J 13/0074 |
| 11,153,001 B2* | 10/2021 | Yu | H04B 7/088 |
| 11,202,241 B2* | 12/2021 | Yang | H04W 72/046 |
| 2006/0244660 A1* | 11/2006 | Ann | G06K 9/0057 342/377 |
| 2007/0035442 A1* | 2/2007 | Manasson | H01Q 21/22 342/375 |
| 2012/0299765 A1* | 11/2012 | Huang | H01Q 21/205 342/81 |
| 2013/0230081 A1* | 9/2013 | Wernersson | H04B 7/0617 375/219 |
| 2013/0272263 A1* | 10/2013 | Pi | H04L 5/0023 370/330 |
| 2014/0044044 A1* | 2/2014 | Josiam | H04B 7/063 370/328 |
| 2014/0177607 A1* | 6/2014 | Li | H04W 52/42 370/336 |
| 2014/0349630 A1* | 11/2014 | Hyde | H04B 7/026 455/418 |
| 2015/0016291 A1* | 1/2015 | Kim | H04B 7/0413 370/252 |
| 2015/0016379 A1* | 1/2015 | Nam | H04B 7/0639 370/329 |
| 2015/0092582 A1* | 4/2015 | Liao | H04J 11/005 370/252 |
| 2015/0094076 A1* | 4/2015 | Inoue | H04W 72/046 455/452.1 |
| 2015/0124688 A1* | 5/2015 | Xu | H04L 27/2607 370/312 |
| 2015/0236762 A1* | 8/2015 | Ko | H04B 7/046 375/260 |
| 2015/0341095 A1* | 11/2015 | Yu | H04B 7/061 370/252 |
| 2015/0341103 A1* | 11/2015 | Piazza | H01Q 13/10 375/267 |
| 2015/0372792 A1* | 12/2015 | Damnjanovic | H04W 72/02 370/329 |
| 2016/0080051 A1* | 3/2016 | Sajadieh | H04W 28/0289 375/267 |
| 2016/0080052 A1* | 3/2016 | Li | H04B 7/0632 375/267 |
| 2016/0149680 A1* | 5/2016 | Kang | H04B 7/0639 370/329 |
| 2016/0380354 A1* | 12/2016 | Bozier | H01Q 1/02 455/562.1 |
| 2016/0381590 A1* | 12/2016 | Lysejko | H04B 7/02 370/252 |
| 2016/0381591 A1* | 12/2016 | Lysejko | H04W 88/04 370/252 |
| 2017/0006629 A1* | 1/2017 | Jung | H04W 72/046 |
| 2017/0026095 A1* | 1/2017 | Ashrafi | H04L 9/0852 |
| 2017/0194553 A1* | 7/2017 | Ifju | B32B 37/144 |
| 2017/0238294 A1* | 8/2017 | Lim | H04L 5/0023 370/277 |
| 2017/0245165 A1* | 8/2017 | Onggosanusi | H04L 5/0094 |
| 2017/0272998 A1* | 9/2017 | Choi | H04W 76/10 |
| 2018/0083681 A1* | 3/2018 | Faxer | H04B 7/0626 |
| 2018/0176801 A1* | 6/2018 | Rune | H04B 7/0617 |
| 2018/0176949 A1* | 6/2018 | Islam | H04B 7/0695 |
| 2018/0205420 A1* | 7/2018 | Petersson | H04B 7/0632 |
| 2018/0219587 A1* | 8/2018 | Huo | H04B 1/40 |
| 2018/0262246 A1* | 9/2018 | Faxer | H04B 7/0478 |
| 2018/0262272 A1* | 9/2018 | Ashrafi | H04L 9/0858 |
| 2018/0279239 A1* | 9/2018 | Si | H04W 76/28 |
| 2018/0310283 A1* | 10/2018 | Deenoo | H04L 5/0048 |
| 2018/0352550 A1* | 12/2018 | Wilhelmsson | H04W 72/0453 |
| 2018/0372830 A1* | 12/2018 | Schuehler | G01S 13/886 |
| 2019/0036590 A1* | 1/2019 | Nagaraja | H04B 7/0695 |
| 2019/0053162 A1* | 2/2019 | Islam | H04W 52/0229 |
| 2019/0104542 A1* | 4/2019 | Chendamarai Kannan | H04W 74/0808 |
| 2019/0123864 A1* | 4/2019 | Zhang | H04B 7/024 |
| 2019/0124639 A1* | 4/2019 | Nilsson | H04W 72/046 |
| 2019/0182007 A1* | 6/2019 | Liu | H04L 5/003 |
| 2019/0182786 A1* | 6/2019 | Wang | H04W 56/0015 |
| 2019/0191411 A1* | 6/2019 | Petersson | H04B 7/0617 |
| 2019/0200249 A1* | 6/2019 | Yoon | H04L 5/0057 |
| 2019/0200389 A1* | 6/2019 | Li | H04W 72/1231 |
| 2019/0215035 A1* | 7/2019 | Huang | H04B 7/063 |
| 2019/0230545 A1* | 7/2019 | Liou | H04W 24/10 |
| 2019/0238304 A1* | 8/2019 | Estevez | H04W 72/0446 |
| 2019/0341984 A1* | 11/2019 | Zhu | H04B 7/0639 |
| 2019/0373595 A1* | 12/2019 | Sadiq | H04W 72/085 |
| 2020/0036425 A1* | 1/2020 | Ren | H04B 7/0456 |
| 2020/0036431 A1* | 1/2020 | Petersson | H04B 7/088 |
| 2020/0067615 A1* | 2/2020 | Ghanbarinejad | H04B 17/104 |
| 2020/0092785 A1* | 3/2020 | Yang | H04W 76/19 |
| 2020/0127709 A1* | 4/2020 | Klemes | H01P 5/227 |
| 2020/0127729 A1* | 4/2020 | Klemes | H04L 27/2665 |
| 2020/0178338 A1* | 6/2020 | Ahn | H04B 7/0626 |
| 2020/0186229 A1* | 6/2020 | Raghavan | H04W 24/10 |
| 2020/0186230 A1* | 6/2020 | Solichien | H04B 17/24 |
| 2020/0252806 A1* | 8/2020 | Yerramalli | H04W 72/082 |
| 2020/0337103 A1* | 10/2020 | Harada | H04W 76/27 |
| 2020/0366359 A1* | 11/2020 | Nilsson | H04J 11/0036 |
| 2020/0389350 A1* | 12/2020 | Harada | H04B 7/0617 |
| 2021/0051495 A1* | 2/2021 | Gupta | H04L 1/1812 |
| 2021/0058131 A1* | 2/2021 | Zhu | H04W 16/28 |
| 2021/0058133 A1* | 2/2021 | Takeda | H04W 72/042 |
| 2021/0105171 A1* | 4/2021 | Chen | H04W 72/04 |
| 2021/0134301 A1* | 5/2021 | Yang | G10L 13/00 |
| 2021/0168744 A1* | 6/2021 | Matsumura | H04B 7/0626 |
| 2021/0282168 A1* | 9/2021 | Matsumura | H04W 72/1273 |
| 2021/0336688 A1* | 10/2021 | Lee | H04W 24/10 |
| 2021/0337397 A1* | 10/2021 | Nilsson | H04W 16/28 |
| 2021/0344558 A1* | 11/2021 | Lee | H04L 5/14 |

* cited by examiner

SYSTEM AND METHOD FOR MAINTAINING LINK COMMUNICATIONS IN MILLIMETER WAVE CELLULAR NETWORKS

BACKGROUND

1. Field

The disclosure of the present patent application relates to cellular communication networks, and particularly to a system and method for maintaining communications in a cellular network that helps to reduce broken links between a base station and a mobile station.

2. Description of the Related Art

Since the 1990s, cellular communication networks have become a staple in modern society. Cellular networks allow the transmission of voice and data from lightweight, low power devices, such as cellular telephones, tablets, laptops, etc. (generally referred to as mobile stations) over a great range through cells of land-based base stations (or satellite communications links). Cellular networks generally operate at microwave frequencies (300 MHz and up, or at millimeter wavelengths). Since the mobile stations operate at very low power (typically at less than 10 W) at millimeter wavelengths, and even the base stations operate at 100 W or less (typically with directional antennas aimed in three different directions per cell), there is sometimes a problem with the signals dropping out due to obstructions (such as trees, buildings, meteor showers (for satellite links), etc.) between the base station and the mobile station, particularly when the mobile station moves during transmission. Thus, a system and method for maintaining communications in a cellular network solving the aforementioned problems is desired.

SUMMARY

The system and method for maintaining communications in a cellular network provides for automatically generating a bundle of partially overlapping beams when the primary link between a base station (BS) and a mobile station (MS) degrades so that the signal-to-noise ratio (SNR) of a received transmission falls below a defined threshold. The overlapping beams are generated by a beamformer having a circular array of antennas, the array being divided into groups radiating the signal in adjacent but partially overlapping sectors at an amplitude determined by extended Hamming codes having zero cross correlation. The bundle is radiated over a 360° pattern so that it overlaps the blocked signal. The MS demodulates and retrieves received signals having the highest correlation. The recovery time is quicker than conventional systems and methods, e.g., 200 microseconds when the MS uses a narrow pencil beam (5° beamwidth).

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The system and method for maintaining communications in a cellular network provides for automatically generating a bundle of partially overlapping beams when the primary link between a base station (BS) and a mobile station (MS) degrades so that the signal-to-noise ratio (SNR) of a received transmission falls below a defined threshold. The overlapping beams are generated by a beamformer having a circular array of antennas, the array being divided into groups radiating the signal in adjacent but partially overlapping sectors at an amplitude determined by extended Hamming codes having zero cross correlation. The bundle is radiated over a 360° pattern so that it overlaps the blocked signal. The MS demodulates and retrieves received signals having the highest correlation. The recovery time is quicker than conventional systems and methods, e.g., 200 microseconds when the MS uses a narrow pencil beam (5° beamwidth).

A link recovery scheme is proposed for standalone (SA) millimeter wave cellular networks. This reactive scheme provides link fault-tolerance by providing a bundle of redundant backup beams for the failed link. Once the primary link between the base station (BS) and the mobile station (MS) is degraded (blocked primary link), then a bundle-beam is radiated that covers the spatial direction of the blocked beam. The failure alarm for the primary link that is affiliated with the optimum BS beamforming and MS combining vectors (primary beams) is when the received signal to noise ratio (SNR) drops below a specific threshold, after which the spectral efficiency and channel capacity is degraded.

Furthermore, a multi-beam analog beamformer (ABF) is proposed that radiates simultaneous, adjacent partially-overlapping beams (bundle). This is opposed to existing analog beamforming architectures that are limited to a single beam radiation. The antennas in the circular array of the proposed analog beamformer are divided into groups (sections). A single beam is radiated from each section in a specific direction. As a result, the multiple sections here radiate multiple simultaneous adjacent beams that are partially overlapped. The antennas in each section are connected to a section of phase shifters, where each antenna has its own phase shifter (number of antennas is equal to the number of phase shifters). Hence each antenna section has its own phase shifter section. The phase shift (in angles) is the same for all the antennas in each section. This creates a constructive signal pattern in each section from all its antennas. Similarly, the adjacent section has its own phase shift value, fed to all antennas from the phase shifters. Adjacent sections have adjacent partially overlapped radiated beams that point at a different angle. For example, the overall constructive beam from section A is pointed towards 90° degrees, with a beamwidth of 15°. Meanwhile, Section B is pointed (directed at) towards 100° with the same beamwidth. This extends until all the spatial directions [0°, 360°] are covered simultaneously by the beams. Therefore, this ABF can support spatial diversity and spatial multiplexing (when using time division multiplexing), despite having a single RF chain.

When a blockage occurs, the BS then uses the bundle (that overlays the blocked beams like an umbrella) to transmit using the multi-beams. Therefore, the MS uses equal gain combining (EGC) in order to strengthen the signals from all the directions of the beams in the bundle. Then, the signal level will increase by multiple folds.

In the case of multi-users, it is important to distinguish the incoming signals from the different beams, since all the sections are connected to a single RF chain, i.e., all sections in a bundle carry the same modulated signal. In order to distinguish bundles for different users, the orthogonality concept is applied. Namely, the adjacent beams radiated from the ABF are orthogonal in order to avoid interference, and in order to extract the signal of interest received from different directions, which can be affiliated with a specific direction and user. This orthogonality is reserved by proposing setting values for the antenna weights in the circular array of the ABF. In particular, the amplitudes of the antennas are chosen using extended Hamming codes, which feature zero cross correlation. New codes are developed here that are applied to the antenna amplitude weights. Therefore, each beam from each section in the bundle have a unique code.

Thus, distinguishable signals are generated from each beam in the bundle, by having unique spatial signatures in each direction. These codes are similar at the BS and MS. At the MS side, the received signals are multiplied (correlated) by all the codes, then the signal that results in the highest correlation indicates signals of interest (SoI) that need to be demodulated and retrieved. Meanwhile, the received signals that result in zero cross-correlation are discarded (for other users).

Furthermore, for the first time, an analog beamformer is designed using circular antenna arrays, in order to achieve symmetric beamwidth at all spatial directions, thus avoiding beam broadening in the end-fire direction, as is the case in uniform linear arrays), as well as reduced sidelobe levels (SLL).

The proposed scheme delivers one the fastest recovery schemes in the millimeter wave literature, where near-instantaneous link recovery is established between the BS and MS. This alternative link is formed once blockage is triggered for the primary link. The proposed reactive scheme eliminates the requirements for beam scanning, or any search for alternative directions. Namely, the direction of the blocked beam is realized in one of the directions of the beams in the bundle, but at higher directivity. This directivity introduces higher gain margins that compensate for the losses caused by the obstacles. Moreover, the additional beams in the bundle create a rich scattering profile, thereby increasing the rays and clusters in the received signal profile. This enables the MS to leverage equal gain combining and other diversity techniques to enhance the signal quality, thus increasing the signal quality, channel capacity, spectral efficiency, without any drops in the communication sessions.

Finally, the near-instantaneous recovery times for the proposed scheme make mmWave networks suitable for real-time delay-sensitive services that require very reduced latencies. Namely, the recovery times are among the shortest times reported in the literature. Specifically, 200 microseconds are required when the MS is using a narrow pencil beam (5° in beamwidth), i.e., 64 total beams in the spatial domain.

Figure 1:
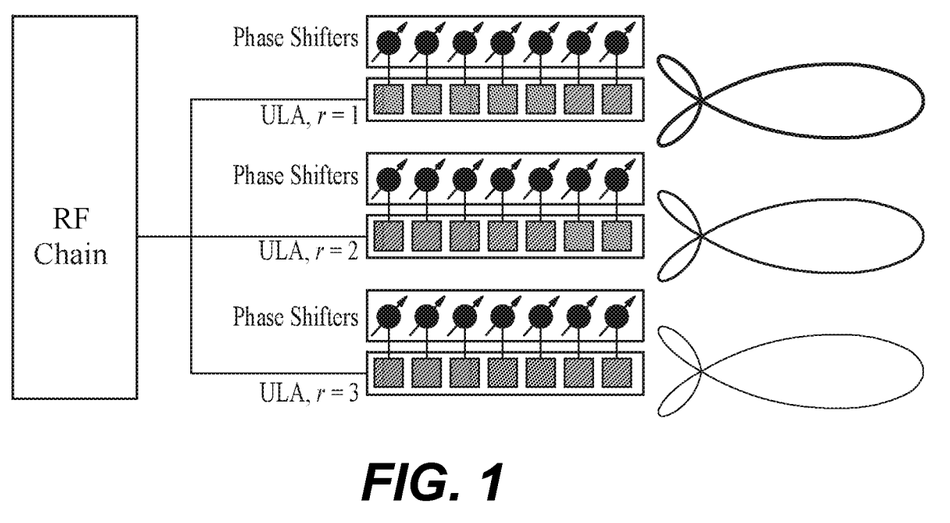
FIG. 1 is a schematic diagram of a parallel analog beamformer used at the MS in a system for maintaining communications in a cellular network.

Consider a mobile station (MS) equipped with an analog beamformer that is composed of parallel uniform linear arrays (ULA), where each ULA radiates a single beam, i.e., forming simultaneous multiple beam radiation in different directions. Each antenna is connected to a single analog phase shifter to provide continuous scanning capabilities (as opposed to step scanning in digital phase shifters). The ULAs are then connected to a single RF chain, as shown in FIG. 1.

In the present system, a multi-beam parallel array model is proposed at the mobile station (MS). Consider a mobile station (MS) equipped with a group of $r=1, 2, \ldots, R$ parallel arrays, each composed of $n=1, 2, \ldots, N_r$ co-polarized antenna elements arranged in a linear geometric setting, i.e., forming one-dimensional radiation (1D). The elements are uniformly oriented with $d_r$ equidistant spacing, i.e., $d=\lambda/2$, where $\lambda$ represents the mmWave wavelength, $\lambda=c/f_c$, where c is the speed of light, and $f_c$ is the carrier frequency. This spacing value is chosen so that the grating lobes and pattern blindness are avoided, as well as to ensure that there are minimal mutual coupling effects. Thus, it satisfies the formula $d<(1+|\theta_0^r|)$, where the variable $\theta_0^r$ is the observation angle from array r at the mobile station (MS) in azimuth direction.

The maximum radiation pattern for the array points along $\theta_0^r$ scanning directions for an even number of elements in any spatial direction is expressed by the closed-form normalized array response vector at each array r at the mobile station (MS), which, in turn, is represented by the periodic array factor (AF), $A_{MS}^r$. This is expressed as:

$$A_{MS}^r = \frac{1}{N_{MS}^r} \sum_{n=1}^{N_{MS}^r} a_n \exp(j(N_{MS}^r - 1)(k_v d_r \cos\theta_0^r + \beta_{MS}^r)) \quad (1)$$

$$= \frac{1}{N_{MS}^r} \sum_{n=1}^{N_{MS}^r} a_n \exp(j(N_{MS}^r - 1)(\varphi_{MS}^r))$$

where the variable $a_n$ denotes the amplitude excitation for the n-th antenna element, $k_v=2\pi/\lambda$ represents the wave number, and $\beta_{MS}^r$ symbolizes the relative progressive phase shift between the interconnected antenna elements at array r at the mobile station (MS). Note that $\varphi_{MS}=kd \cos\theta_0^{MS}+\beta_{MS}$ is a compact form that represents the array phase function at the mobile station (MS) with a visible region that varies between $-kd \leq \varphi_{MS} \leq kd$. Moreover, the half-power beamwidth (HPBW) at the broadside and scanning directions, i.e., $\forall \theta_0^{MS}(\theta_0^{MS}:0<\theta_0^{MS}\leq\pi)$, is expressed as:

$$\phi_{brd}^{MS} = \cos^{-1}\left(\frac{\lambda}{2\pi d}k_w d\cos\theta_0^{MS} \pm \frac{2.782}{N_{MS}^y}\right), 0 < \theta_0^{MS} \leq \pi, \quad (2)$$

whereas the HPBW at the end fire direction is computed as:

$$\phi_{end\,fire}^{MS} = 2\cos^{-1}(1-1.391\lambda/N_{MS}^y d), \text{ for } \theta_0^{MS}=0,\pi. \quad (3)$$

It is important to note that the spatial footprint of the array increases proportionally to a broadening factor of b, b=1/cos $\theta_0^{MS}$, for directions scanned off the broadside. Moreover, the array gain is gauged by $G_{A_{MS}}=A_{MS}G_\alpha{}^a$, where $G_\alpha$ is the gain for a single antenna element. For example, microstrip rectangular patch antennas are widely chosen for mmWave transceivers, and they provide a gain range of 5-7 dBi.

Each antenna array is fed in parallel by an array of P phase shifters, in particular, quadrature varactor-loaded transmission-line phase shifters. The total number of phase shifters is equal to the number of antennas. Varactor phase shifters are chosen due to their high shifting times (in µs), low power requirements, reduced loss rates, and capability to continuously adjust and control the [0, 2π] spatial plane using a single control voltage unit. The phase shifters are then connected to a single RF chain. Overall, this structure formulates an analog beamformer composed of multiple radiated beams that carry the same modulated data. The benefit of using an analog beamformer here is to reduce the power consumption levels associated with the RF chains, as in the case of digital and hybrid architectures. Since a single RF chain is used at the mobile station (MS), the orthogonal beam coding technique is adopted herein. Namely, the weights of the antenna elements are modified by a unique set of codes to produce unique beams of distinguished signals. The orthogonal codes here create distinguishable spatial signatures for each beam-bundle, and thereby can identify the exact direction of the highest received signal in the beam-bundle from that particular section.

The method exploits orthogonal Hamming codewords, $c_m$, i.e., $c_m[e, d_H]$, where e is the codeword length, and $d_H$ is the Hamming distance between successive codewords. Additionally, each codeword is scaled by the control signals, z, and features $[\mathbf{b}_1, \mathbf{b}_2, \ldots, \mathbf{b}_F]$ codebits, where $\mathbf{b}_F$ is the total number of codebits. Consider the following codewords developed for a single beam-bundle, represented as:

$$c_1 = [-1\ -1\ -1\ -1\ -1\ -1\ -1\ -1] \quad (4)$$
$$c_2 = [1\ -1\ -1\ -1\ 1\ 1\ 1\ -1]$$
$$c_3 = [-1\ 1\ -1\ -1\ 1\ -1\ 1\ 1]$$
$$c_4 = [-1\ -1\ 1\ -1\ 1\ 1\ -1\ 1].$$

These codewords feature zero cross correlation, which yields orthogonal beams in the bundle, hence, receiving distinguishable signals from the direction of the beams. Each codebit in the Hamming codeword is applied to the weight of the single antenna, where the number of codebits $\mathbf{b}_F$ is equal to the number of antennas $N_r$ in the parallel array r. The codebit is either "1" or "−1". If it is "1", then the weight of the antenna remains the same, i.e., the same amplitude and phase. If the codeword is "4", then the conjugate is applied to the weight, i.e., keeping the same amplitude and rotating the phase by π. These codes are reciprocal at the mobile station (MS) and the base station (BS). Therefore, when a signal is received at the base station (BS), it is basically receiving one codeword. The BS multiplies the received codeword (appearing in the weights of the antennas) by all four codewords in order to retrieve the unique codeword and its affiliated beam in the bundle. As a result, the base station (BS) now identifies the direction with the highest signal level.

Figure 2:
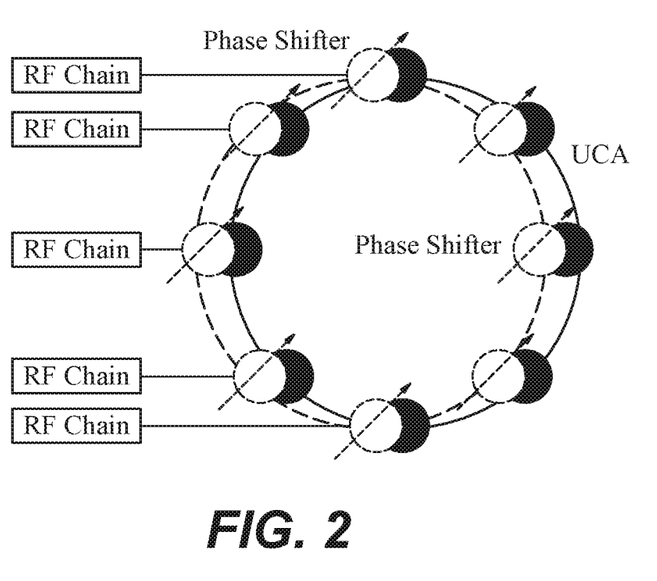
FIG. 2 is a schematic diagram of a digital beamformer used at the BS in a system for maintaining communications in a cellular network.

Digital beamforming is implemented at the base station (BS) due to the abundant power input levels, and the necessity to provide multi-user connectivity. The beamformer architecture shown in FIG. 2 is based on upon a uniform circular array (UCA) with an identical radiation pattern of symmetric beamwidth in all spatial directions (no beam broadening in the end-fire direction), i.e., providing similar signal levels to mobile stations (MSs) at different locations with high directivities. The UCA here also features reduced sidelobe levels (SLL), and it eliminates the need for back-to-back arrays, as in the case of the 1D uniform linear array (ULA). Consider a base station (BS) equipped with a UCA composed of $N_{BS}$ total number of antenna elements, which are uniformly spaced in the x-y plane along radius a in a circular geometric setting. Each $n_{BS}$ antenna, $n_{BS} \in N_{BS}$, is also connected to an analog phase shifter to provide continuous beam scanning. This structure is connected to a group of RF chains $R_{BS}$, where the total number of RF chains is equal to the number of antennas. Overall, this setting results in a single beam radiated from each antenna, i.e., represented by the beamforming vector $v_{BS}$, $v_{BS} \in V_{BS}$, where $V_{BS}$ is the beamforming matrix that represents the beam-bundle at the base station (BS), $B_{BS}$, such that $V_{BS}=V_{bb}V_{an}$, where $V_{bb}$ and $V_{an}$ denote, in order, the beamforming matrices at the baseband and analog stages, i.e., $V_{bb}=n_{BS}\times r_{BS}$ and $V_{an}=r_{BS}\times n_{BS}$. Each vector $v_{BS}$ carries unique modulated data that can be utilized for multi-users, or it supports a single datum to support a mobile station (MS) with a beam-bundle when blockage occurs. This vector is gauged by the AF for the UCA, $A_{BS}$, i.e.:

$$A_{BS} = \sum_{n=1}^{N_{BS}} I_n \exp(jva \sin\theta \cos(\phi - \phi_n^{BS}) + \varphi_s^{BS}), \quad (5)$$

where the angles $\phi$ and $\varphi$ represent the direction along the y- and x-axes, $\phi_n^{BS}$ is the angular position of the $n^{th}$ antenna, and where $\varphi_n^{BS}=2\pi n_{BS}/N_{BS}$. The variables $I_n$, v, and $\phi_s^{BS}$ in Equation (5) symbolize the amplitude of the $n^{th}$ antenna, the wave number, and the maximum radiation principal at the base station (BS), evaluated as:

$$\varphi_0^{BS}=va \sin\theta_0^{BS} \cos(\phi_0^{BS}-\phi_n^{BS}). \quad (6)$$

Consider mobile station (MS) and base station (BS) entities operating in LoS settings in urban outdoor environments composed of various objects in proximity to the mobile station (MS). In addition, a full duplex division duplexing (FDD) channel of reciprocal channel state information (CSI) is implemented at both entities. Then, the downlink (DL) received signal profile at the mobile station (MS), $\gamma_{an}$, is expressed as:

$$\gamma_{bb}=P_{tr}U_{MS}^H V_{BS}Hz+U_{MS}^H w, \quad (7)$$

where $P_{tr}$, H, z, and w denote, in order, the transmitted signal power, the power complex channel, the reference control signal, and the additive Gaussian noise (AWGN), i.e., w∼N(0, $\sigma_w^2$), where $\sigma_w^2$ is the noise variance.

The geometric channel model, H, is employed herein due to the scattering nature of mmWave propagation. This is highly attributed to the large obstacle dimensions, as compared to the propagating wavelength in these bands. Consequently, this yields a reduced scattering profile, and hence results in a poor scattering signal profile for a low number of rays, i.e., a Poisson distribution. In turn, this results in high dependence on the geometry of the objects in the propagation link. This model is expressed as:

$$H = \sqrt{\frac{N_{BS}N_{MS}}{\Gamma_{bl}}} \sum_{k=1}^{K} \sum_{l=1}^{L} h_l V_{BS} U_{MS}^H, \quad (8)$$

where $\Gamma_{bl}$ and $h_l$ represent the blockage path loss model, and the gain of the l-th path. The signal profile here is composed of L total number of paths that are observed in the K total number of clusters, i.e., $L \in K$. These paths follow Rician distribution that accounts for the LoS-to NLoS plink transition caused by blockage effects. Namely, the path gain is modeled as $h_l \sim R(0, \zeta)$, where $\zeta$ is the power ratio between the dominant and other paths. Moreover, the beamforming and combining matrices, $V_{BS}$ and $U_{MS}$ (which also represents the response vectors), are evaluated using their far-field array factors (AF), as presented above in the discussion of beamforming.

As mentioned above, the blockage path loss model, $\Gamma_{bl}$, accounts for LoS-to-NLoS transition when obstacles of different densities are present in the direct propagation link affiliated with the main beam. This model is formulated as follows:

$$\Gamma_{bl} = \mathbb{I}\,[\,\mathbb{P}\,(d)]\Gamma_{LoS}(d) + \mathbb{I}\,[1-\mathbb{P}\,(d)]\Gamma_{NLoS}(d), \quad (9)$$

where $\mathbb{I}$ is an indicator function that specifies the link-blockage state, i.e., $\mathbb{I}(x)=1$ iff $x=1$, and it is set as $\mathbb{I}(x)=0$ otherwise. Moreover, the variables $\Gamma_{LoS}(d)$ and $\Gamma_{NLoS}(d)$ represent the path loss for LoS and NLoS settings, respectively, expressed as:

$$\Gamma_{LoS}(d) = 10 \log_{10}(d_{ref}) + 10\delta_{LoS} \log_{10}(d) \text{ for LoS}, \quad (10)$$

$$\Gamma_{NLoS}(d) = 10 \log_{10}(d_{ref}) + 10\delta_{NLoS} \log_{10}(d) \text{ for NLoS}, \quad (11)$$

where the variable d represents the distance between the base station (BS) and the mobile station (MS), $d_{ref}$ is the close-in reference distance, and $\delta_{LoS}$ and $\delta_{NLoS}$ are the path loss exponents (PLE) for the LoS and NLoS settings, respectively. Moreover, the notations $\mathbb{P}(d)$ and $(1-\mathbb{P}(d))$ denote LoS and NLoS probabilities at the distance d. Here, the probability is $\mathbb{P}(d)=\exp(-\rho d)$, where $\rho$ is the blockage parameter that accounts for obstacles of different dimensions and densities. Note that the higher the blockage parameter, the more blockage effects are caused to the link.

The mobile station (MS) and base station (BS) operate on a standalone (SA) mmWave network in LoS settings of Rician scattering. During the initial access stage, an iterative random search is conducted over all spatial directions at the mobile station (MS) and base station (BS). The process returns the best beamforming and combining vectors (best pointing directions) that yield the highest received signal level, modeled as:

$$(u_{MS}, v_{BS})_{bst} = \max(\gamma_{u,v}), \quad (12)$$

where these best vectors $(u_{MS}, v_{BS})_{bst}$ present the maximum principal directions of the primary beams at the mobile station (MS) and the base station (BS), which are selected for the data-plane transmission. Now, once the session starts, the spectral efficiency can take various levels based on the link quality. First, when the link is in LoS, it features high link quality without obstacles (blockage parameter is zero), $\mathbb{I}(x)=0$, as well as high instantaneous spectral efficiency, $\delta_{inst}$.

When the obstacles in the propagating path become present in the direct link associated with the main beam, its starts to exhibit instantaneous low spectral efficiency, and then blockage mode is in effect. Here, the indicator function is set as $\mathbb{I}(x)=1$ to indicate the LoS to NLoS transition. The blockage threshold is set based on the spectral efficiency level, as:

$$\delta_{inst} \leq \min\{\log_2(1+10^{0.1(SNR-\Omega)}), \delta_{max}\}, \quad (13)$$

where SNR stands for the signal-to-noise ratio, the variable $\Omega$ denotes the loss factor (measured in dB), and $\delta_{max}$ represents the maximum spectral efficiency. Note that the SNR is expressed as:

$$SNR = \frac{P_{tr} G_{MS} G_{BS} |h_l|^2}{\Psi T_0 \mathsf{B}} \quad (14)$$

where $\Psi$, denotes the Boltzmann constant, $T_0$ is the operating temperature, $\mathsf{B}$ is the channel bandwidth, and $G_{MS}$ and $G_{BS}$ are the array gains at the mobile station (MS) and the base station (BS), respectively, and $G_{MS}=g_n U_{MS}$ and $G_{BS}=g_n V_{BS}$, where $g_n$ is the gain for a single antenna element.

Figure 3:
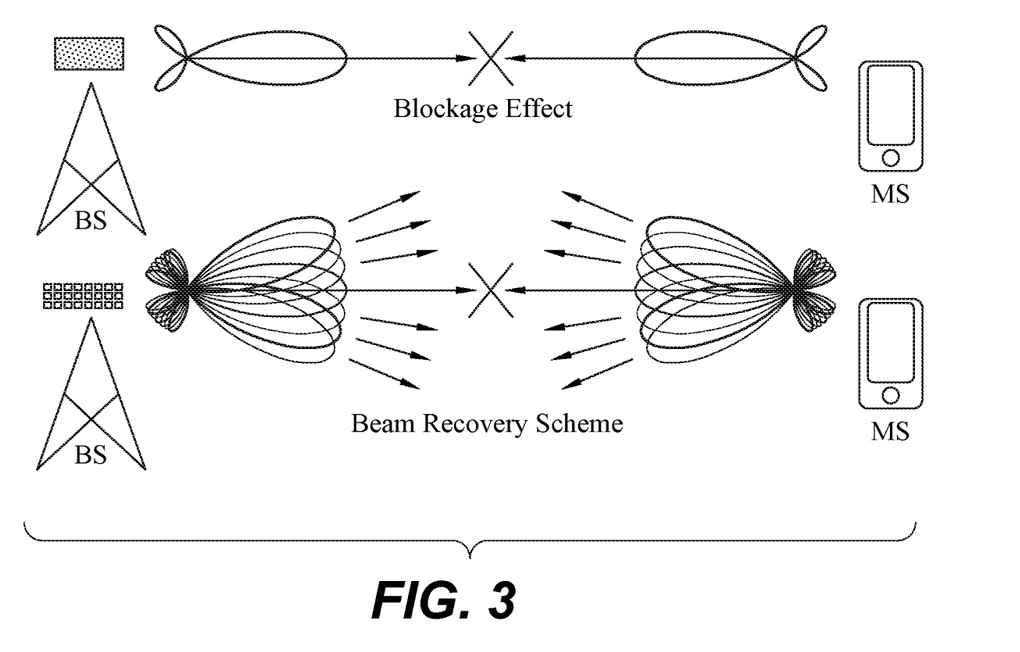
FIG. 3 is a schematic diagram of reaction to loss of signal in a system for maintaining communications in a cellular network.

When the main beam is blocked, the mobile station (MS) and the base station (BS) initiate the beam-bundle as the backup beams to compensate for the signal losses with the main beam, as shown in FIG. 3. Therefore, session drops are avoided. The mobile station (MS) here performs maximal ratio combining (MRC) to amplify high beam signals and attenuate weak beam signals.

Figure 4:
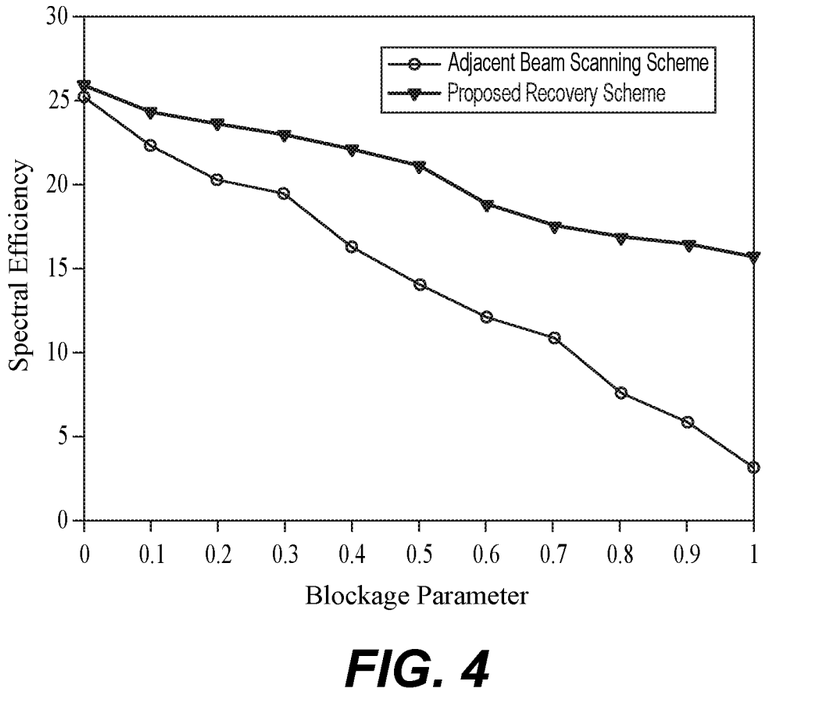
FIG. 4 is a plot of spectral efficiency in a system for maintaining communications in a cellular network compared to the spectral efficiency of conventional systems.

FIG. 4 shows the spectral efficiency for the method at various blockage densities. The method aims to enhance the spectral efficiency once beam blockage is in effect. FIG. 4 shows the efficiency for the method versus conventional recovery methods that test neighboring beam directions or that reset beam scanning procedures. When the direct propagation link between the mobile station (MS) and the base station (BS) is obstacle free (LoS operation), i.e., $\mathbb{I}(x)=0$, high spectral efficiency is observed. As a result, conventional methods and the proposed beam-bundle scheme yield high spectral efficiency. However, when obstacles appear in the propagation path of the primary beam, then the received signal level degrades, affecting capacity levels, and thereby reducing the spectral efficiency, as observed for the conventional methods. The proposed method achieves high spectral efficiency if blockage parameters are dense. This is attributed to the wide spatial space covered by the backup beam-bundle, which also yields a high scattering profile that is leveraged using maximal ratio combining (MRC).

Figure 5:
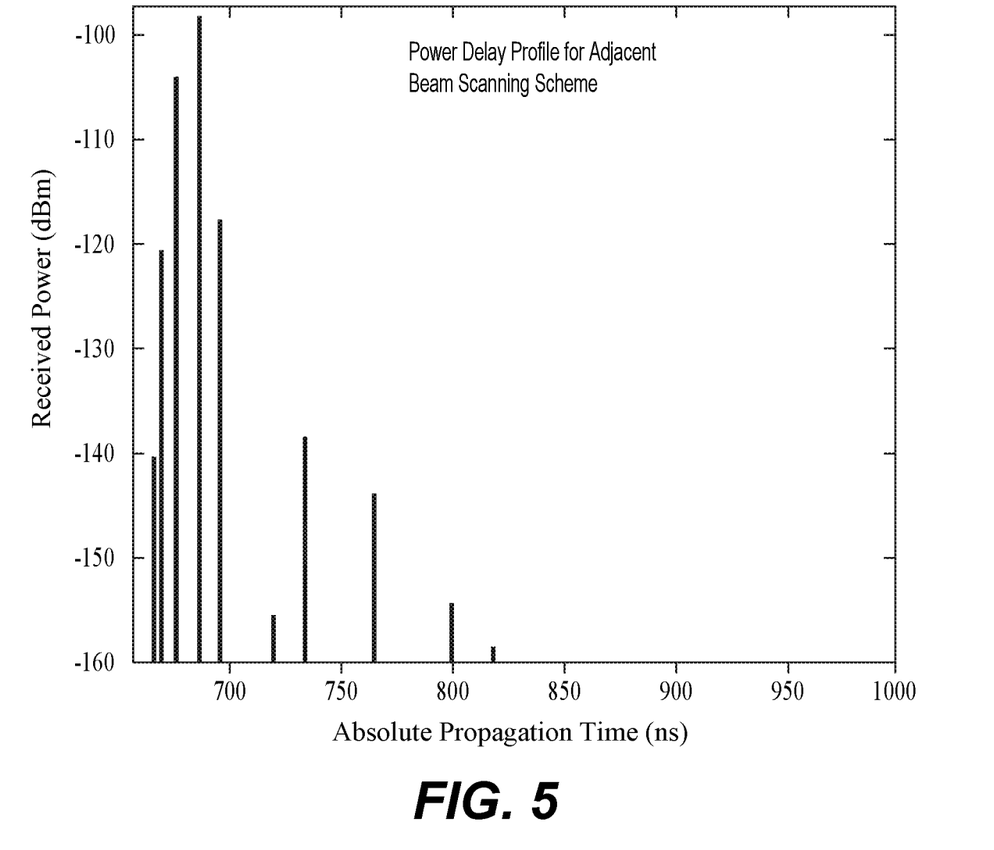
FIG. 5 is a plot of received power as a function of time in a conventional cellular network system.
Figure 6:
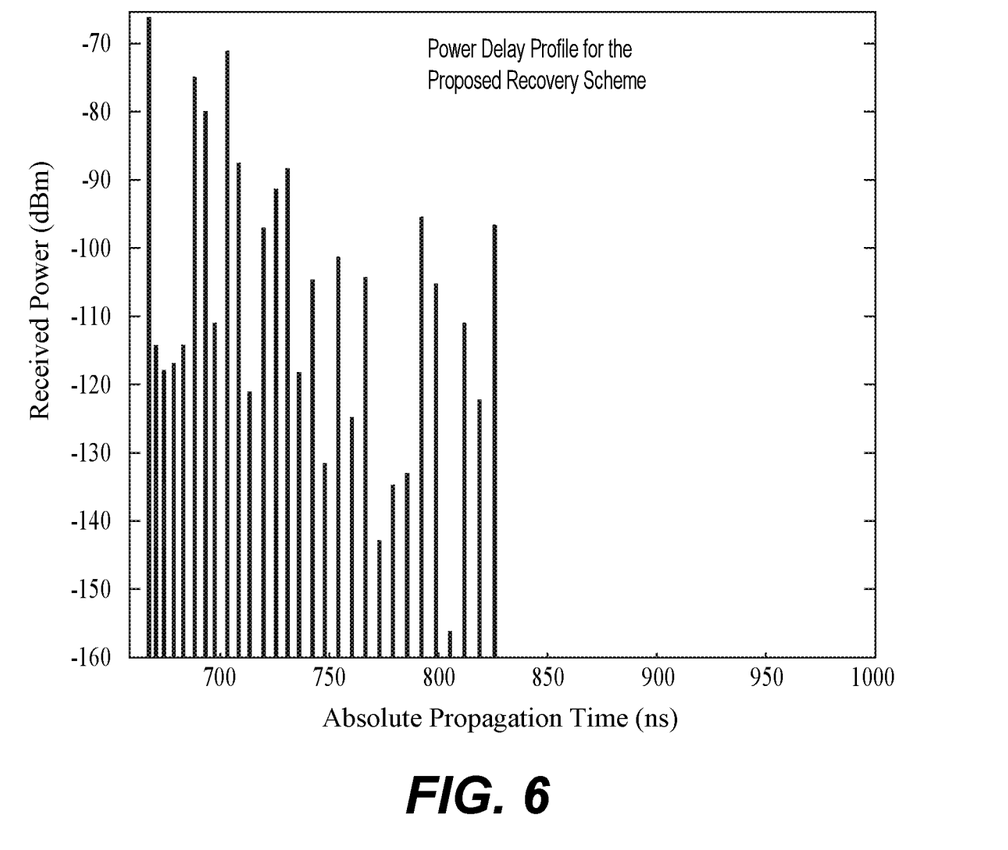
FIG. 6 is a plot of received power as a function of time in a system for maintaining communications in a cellular network.

FIG. 6 shows the received power profile in the time domain for the present method, as opposed to conventional methods (i.e., testing adjacent beam directions), which are shown in FIG. 5. The present link recovery method yields a rich scattering profile due to wide spatial coverage achieved by the instantaneous backup beams, with a half-power beamwidth (HPBW) that exceeds the obstacle's dimensions, as well as enriching the reflections in the Rician path gains in the channel settings. For example, the method exhibits 4-5 rays in the 2-3 clusters when blockage is triggered, as opposed to 2-3 rays in 1-2 clusters for the neighboring beams testing and conventional codebook methods. Furthermore, the recorded clusters here are received with power levels of −60 dBm, which relaxes the receiver sensitivity requirements. This is compared with −120 dBm and −140 dBm signal levels for the other schemes, which results in significant challenges in acquiring the signal, limiting coverage ranges, as well as providing poor low channel capacity and impeding high channelization services for standalone (SA) mmWave networks.

Figure 7:
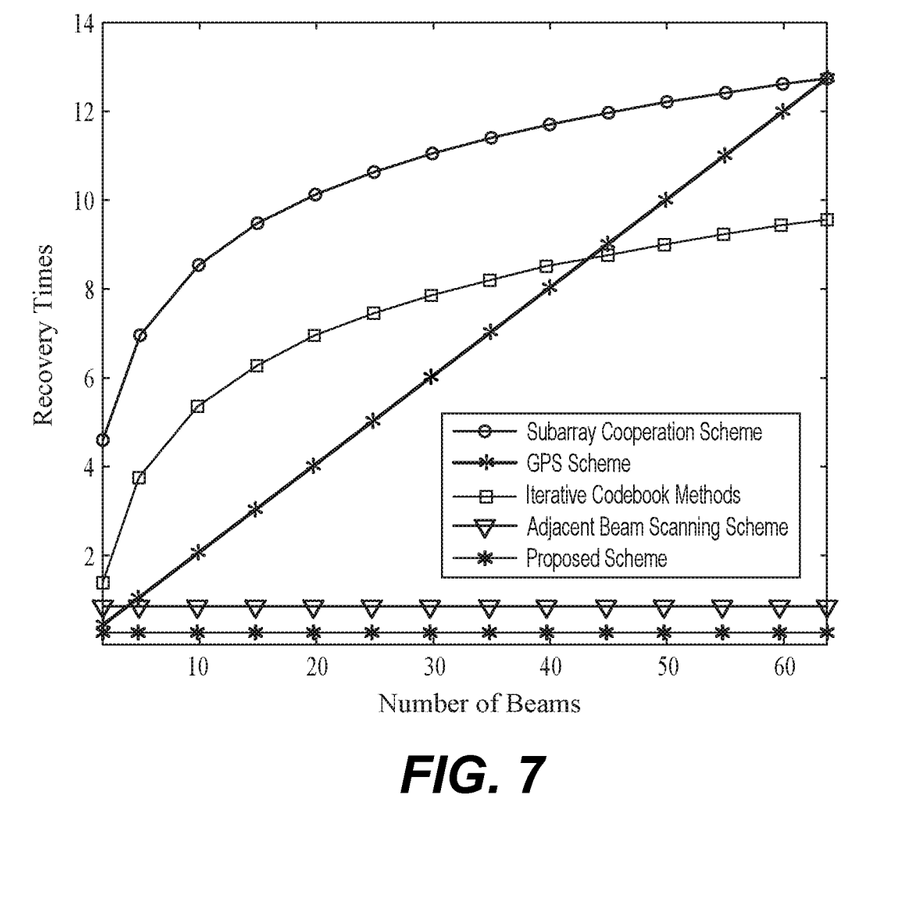
FIG. 7 is a plot of recovery time as a function of number of beams in a system for maintaining communications in a cellular network compared to conventional systems and methods.

One major performance metric for beam recovery methods is the beam recovery time. It is defined as the overall time period that is required to determine an alternative link direction once the direct link of the main beam is blocked. Namely, it is the period required to determine the new best beamforming and combining vectors, and their principal directions at the mobile station (MS) and the base station (BS). FIG. 7 shows the recovery times ($T_{rec}^{MS}$) at the MS (likewise the recovery times $T_{rec}^{MS}$ for the base station (BS)). The proposed method achieves instantaneous recovery times without the requirement for beam scanning or resetting the access schemes when a link is blocked. The only time required here is the PSS transmission duration of the beam vectors (i.e., 200 μs). Overall, the scheme here promotes the feasibility as standalone (SA) mmWave with ultra-low recovery times, thereby realizing low latency requirements.

It is to be understood that the system and method for maintaining communications in a cellular network is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for maintaining communications in a cellular network, comprising:
   a cellular network base station having:
      a digital beamformer having a uniform circular array of antennas for radiating symmetric beams, the antennas being directed to radiate a signal at discrete angles from 0° through 360° from the base station, each of the antennas having a beamwidth such that adjacent pairs of the antennas have partially overlapping radiated signal beams, the antennas being grouped in a plurality of bundles; and
      means for determining when a received signal has a signal-to-noise ratio falling below a threshold level, thereby detecting a broken communications link;
   at least one cellular network mobile station having:
      an analog beamformer having a multi-beam plurality of parallel antenna arrays aligned linearly, the antennas being equally spaced;
      an array of phase shifters feeding each of the parallel antenna arrays with an identical message in parallel, each of the antennas having a corresponding one of the phase shifters connected thereto; and
      a coding circuit for generating orthogonal Hamming codewords and modulating signals fed to each of the parallel antenna arrays with a different one of the orthogonal Hamming codewords, whereby the base station may detect direction of the mobile station having the broken communications link, the base station having means for automatically selecting a bundle of antenna in the uniform circular array to radiate a lost communication in the direction of the mobile station having the broken communications link to maintain communications between the base station and the mobile station.

2. The system for maintaining communications in a cellular network according to claim 1, wherein the cellular network operates on microwave frequency bands, said base station and said at least one mobile station each transmitting and receiving at millimeter wavelengths.

3. The system for maintaining communications in a cellular network according to claim 1, wherein each said phase shifter in said mobile station comprises a quadrature varactor-loaded transmission-line phase shifter.

4. The system for maintaining communications in a cellular network according to claim 1, wherein said base station has a plurality of phase shifters divided into sections, each of the bundles having a corresponding section of the phase shifters connected thereto, each of the antennas having a corresponding phase shifter connected thereto, each of the phase shifters in a section being configured to impart identical phase shifts to all of the antennas in the corresponding bundle.

5. The system for maintaining communications in a cellular network according to claim 1, wherein said at least one mobile station comprises a plurality of mobile stations under control of multiple users, the signals generated by different users being orthogonal to each other.

6. The system for maintaining communications in a cellular network according to claim 1, wherein adjacent antennas in said digital beamformer generate beams having a beamwidth of 15° spaced apart 10° radially, whereby adjacent beams are partially overlapping.

7. A method for maintaining communications in a cellular network, comprising the steps of:
   determining a blockage in a direct link of a communication session between a base station and a mobile station in the cellular network by measuring the direct link blockage against a blockage threshold and initiating a blockage mode when it has been determined that a blockage effect is present;
   forming simultaneous multiple beams for radiation in different directions using a plurality of parallel uniform linear antenna arrays where each linear array includes co-polarized antenna elements arranged in a linear geometric pattern when the blockage effect is present;
   imparting a phase shift to the simultaneous multiple beams using a plurality of quadrature varactor loaded analog transmission line phase shifters by controlling and adjusting a spatial plane of the simultaneous multiple beams using a single voltage control unit and transmitting the multiple beams as a beam bundle when the blockage effect is present, the plurality of quadrature varactor loaded analog transmission line phase shifters and the plurality of parallel uniform linear antenna arrays being connected to a single RF chain in order to implement orthogonal beam coding to create a distinguishable signature for the beam bundle such that a backup beam is chosen from the transmitted beam-bundle by the mobile station to ensure that communication session drop is avoided.

8. The method for maintaining communications according to claim 7, wherein the orthogonal beam coding includes a Hamming code implementing orthogonal Hamming codewords having a specified codeword length and a specified Hamming distance between codewords, the codewords having zero cross correlation.

9. The method for maintaining communications according to claim 8, wherein the Hamming codewords further comprise codebits such that each codebit therein is applied as a weight to each single antenna element.

10. The method for maintaining communications according to claim 9, wherein the Hamming codebit is either a 1 or −1 for controlling the amplitude and phase of the antenna element such that in the event of a codebit of −1, the phase is shifted by π.

11. The method for maintaining communications according to claim 7, wherein the step of determining a blockage in a direct link of a communication session between said base station and said mobile station further includes implementing a geometric path model following Rician distribution and further implementing a blockage path loss model.

12. The method for maintaining communications according to claim 11, wherein the blockage path loss model addresses loss of signal and non-loss of signal transitions for obstacles of different densities in the direct link.

13. A method for maintaining communications in a cellular network, comprising the steps of:
    determining a blockage in a direct link of a communication session between a base station and a mobile station in the cellular network by measuring the direct link blockage against a blockage threshold and initiating a blockage mode when it has been determined that a blockage effect is present;
    forming, an identical radiation pattern of symmetric beamwidths in all spatial directions using a uniform circular antenna array including co-polarized antenna elements uniformly spaced in an x-y plane along a radius in a circular geometric pattern when the blockage effect is present;
    imparting a phase shift to the symmetric beamwidths using a plurality of analog transmission line phase shifters and transmitting the symmetric beamwidths when the blockage effect is present, the plurality of analog transmission line phase shifters and the uniform circular antenna array being connected to a plurality of RF chains in order to implement an orthogonal beam coding to create distinguishable signatures for the symmetric beamwidths such a backup beam is chosen from the transmitted beamwidths by the mobile station to ensure that communication session drop is avoided.

14. The method for maintaining communications according to claim 13, wherein the orthogonal coding includes a Hamming code implementing orthogonal Hamming codewords of a specified codeword length and a specified Hamming distance between codewords, the codewords having zero cross correlation.

15. The method for maintaining communications according to claim 14, wherein the Hamming codewords further comprise codebits such that each codebit therein is applied as a weight to each single antenna element.

16. The method for maintaining communications according to claim 15, wherein the Hamming codebit is either a 1 or −1 for controlling the amplitude and phase of the antenna element such that in the event of a codebit of −1, the phase is shifted by $\pi$.

17. The method for maintaining communications according to claim 13, wherein the step of determining a blockage in a direct link of a communication session between said base station and said mobile station further includes implementing a geometric path model following Rician distribution and further implementing a blockage path loss model.

18. The method for maintaining communications according to claim 17, wherein the blockage path loss model addresses loss of signal and non-loss of signal transitions for obstacles of different densities in the direct link.

19. The method for maintaining communications according to claim 17, wherein the number of antenna elements is equal to the number of RF chains.

* * * * *